(12) United States Patent
Shaffer et al.

(10) Patent No.: US 6,298,448 B1
(45) Date of Patent: Oct. 2, 2001

(54) APPARATUS AND METHOD FOR AUTOMATIC CPU SPEED CONTROL BASED ON APPLICATION-SPECIFIC CRITERIA

(75) Inventors: Shmuel Shaffer, Palo Alto; William J. Beyda, Cupertino; Cheryl Gold, Palo Alto, all of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/217,693

(22) Filed: Dec. 21, 1998

(51) Int. Cl.⁷ ........................................................ G06F 1/32
(52) U.S. Cl. .................. 713/322; 713/324; 713/310; 713/320
(58) Field of Search ...................... 713/310–322, 713/323–324, 501–503; 710/129–130

(56) References Cited

U.S. PATENT DOCUMENTS

| 4,819,164 | | 4/1989 | Branson . | |
|---|---|---|---|---|
| 4,821,229 | * | 4/1989 | Jauregui | 710/100 |
| 5,142,684 | | 8/1992 | Perry et al. | 395/750 |
| 5,218,704 | | 6/1993 | Watts, Jr. et al. . | |
| 5,263,173 | * | 11/1993 | Gleason | 709/1 |
| 5,490,059 | | 2/1996 | Mahalingaiah et al. . | |
| 5,504,910 | | 4/1996 | Wisor et al. . | |
| 5,546,568 | | 8/1996 | Bland et al. . | |
| 5,586,308 | * | 12/1996 | Hawkins et al. | 395/556 |
| 5,623,647 | * | 4/1997 | Maitra | 713/501 |
| 5,657,482 | * | 8/1997 | Klein | 713/503 |
| 5,727,193 | | 3/1998 | Takeuchi . | |
| 5,754,869 | | 5/1998 | Holzhammer et al. . | |
| 5,774,704 | * | 6/1998 | Williams | 395/556 |
| 5,778,237 | * | 7/1998 | Yamamoto et al. | 713/340 |
| 5,812,871 | | 9/1998 | Lundberg et al. | 395/800.43 |
| 5,909,585 | * | 6/1999 | Shinmiya | 713/322 |
| 5,925,133 | * | 7/1999 | Buxton et al. | 713/323 |

FOREIGN PATENT DOCUMENTS 0 785 498   7/1997  (EP) ................................. G06F/1/32

OTHER PUBLICATIONS

Wildstrom Stephen H., "Can a Laptop be too Fast?", *Business Week*, Technology & You, May 4, 1998, p. 27.
Copy of Written Opinion for Int'l Appln. No. PCT/US99/29781; date of opinion: Oct. 4, 2000.

* cited by examiner

*Primary Examiner*—Robert Beausoleil
*Assistant Examiner*—Raymond N Phan

(57) ABSTRACT

A CPU speed control system for use in devices having microprocessors or microcontrollers which may also be operated using battery power. The system includes a programmable frequency synthesizer for providing the CPU and other system buses in the device with a variable clocking frequency based on the application or interrupt being executed by the device. The frequency synthesizer output may be dynamically varied according to a particular application or task that is to be executed by the device or based on total CPU usage. The operating system of the device and the CPU are both capable of controlling the frequency synthesizer output to ensure that the CPU is operating at the most power efficient level possible.

19 Claims, 2 Drawing Sheets

APPARATUS AND METHOD FOR AUTOMATIC CPU SPEED CONTROL BASED ON APPLICATION-SPECIFIC CRITERIA

BACKGROUND OF THE INVENTION

1. Field of the Invention

The present invention relates to a central processing unit (CPU) speed control system and, more particularly, to a task specific control system for enabling the CPU to be clocked at varying speeds corresponding to the particular task being executed.

2. Description of the Related Art

Various CPU speed control systems are known for enabling the clock speed of a CPU and/or various system buses in a personal computer (PC) to be reduced during periods of inactivity. Such CPU speed control systems generally result in less energy consumption by desktop type PCS whose usual power source is about 120 volt, 60 Hertz (Hz) wall connection. For example, substantial savings in electrical power consumption are possible due to the large numbers of computers which are left on for extended periods of time, even when not being actively used. Similarly, CPU speed control systems also result in more efficient use of battery power in portable PCS, resulting in extended battery life or smaller batteries.

Power consumption management systems, present in portable and desktop computers, traditionally rely upon hardware timers which, upon expiration, turn off or reduce power to various systems components. For example, the current "Green Computer" energy saving standards allow devices to be powered off after periods of inactivity. In particular, monitors are shut down, disks stop spinning, and eventually the entire system is shut down in an orderly fashion.

Power saving features have become increasingly important over the past few years because of the dramatic increase in processor clock speeds. In particular, as clock speeds increase, systems having faster microprocessors use significantly more power than systems with slower clock speed microprocessors. For example, a 266 MHz Intel Pentium II processor may draw three times the current of a 75 MHz classic Pentium processor. Furthermore, not only the CPU, but often the entire system bus operates off of a single clock, so all of the chip sets, including I/O controllers, memory, and other components draw higher currents at higher clock speeds than sometimes necessary for efficient use of the computer system.

CPU clock control systems have been developed. Examples of such systems are disclosed in U.S. Pat. Nos.: 5,546,568; 5,504,910; 5,754,869; 4,819,164; 5,490,059; and 5,218,704. Such CPU speed control systems normally include a CPU and a frequency synthesizer for supplying the CPU with an operating clock which may be operated at different frequencies. These CPU clock control systems vary the clock speed of the frequency synthesizer according to a number of different considerations. Such considerations may include, for example, the amount and frequency of system activity, the temperature of the CPU, and whether the computer system is receiving keyboard or other input. Unfortunately, such CPU speed control systems rely on prophylactic methods of speed control wherein the CPU is stopped or slowed down based on particular criteria. For example, the CPU speed may be varied depending on the amount of system activity, the temperature of the CPU or whether the computer system is sensing any input. However, CPU clock speeds are generally not adaptable to task specific microprocessor clock speed requirements. Thus, there is a need for a CPU speed control system which enables the CPU input clock to be varied in accordance with the particular task or application being executed.

SUMMARY OF THE INVENTION

The present invention relates to a CPU speed control system for use in devices having microprocessors or microcontrollers which may also be operated using battery power. The system includes a programmable frequency synthesizer for providing the CPU and other system buses in the device with a variable clocking frequency based on the application or interrupt being executed by the device. In accordance with one aspect of the invention, a memory device is provided wherein processing performance requirements may be stored in a table to enable the frequency synthesizer output to be varied according to a particular application or task that is to be executed by the device. The operating system of the device and the CPU are both capable of controlling the frequency synthesizer output to ensure that the CPU is operating at the most power efficient level for any given task.

The present invention will be more readily understood with reference to the following specifications and attached drawings.

DETAILED DESCRIPTION

The present invention relates to a control system for varying the CPU clock rate to correspond with the processing requirements of the device when executing predetermined applications or servicing predetermined interrupts. The system includes a programmable frequency synthesizer for providing the CPU and other system buses in the device with a variable clocking frequency. Although only an exemplary PC embodying the present invention is illustrated in FIG. 1, the principles of the present invention are clearly applicable to other types of microprocessor-based devices and/or battery powered intelligent devices that need to conserve battery power, such as PCS, cellular phones, personal digital assistants (PDA), and battery backed-up systems like private branch exchange (PBXs) or medical equipment.

In accordance with one aspect of the invention, the CPU speed control system is adapted to enable the clock module 50 to provide a programmably variable clock frequency to the CPU 20 based on whether the CPU 20 is idle or receiving input, such as from a mouse or keyboard.

Figure 1:
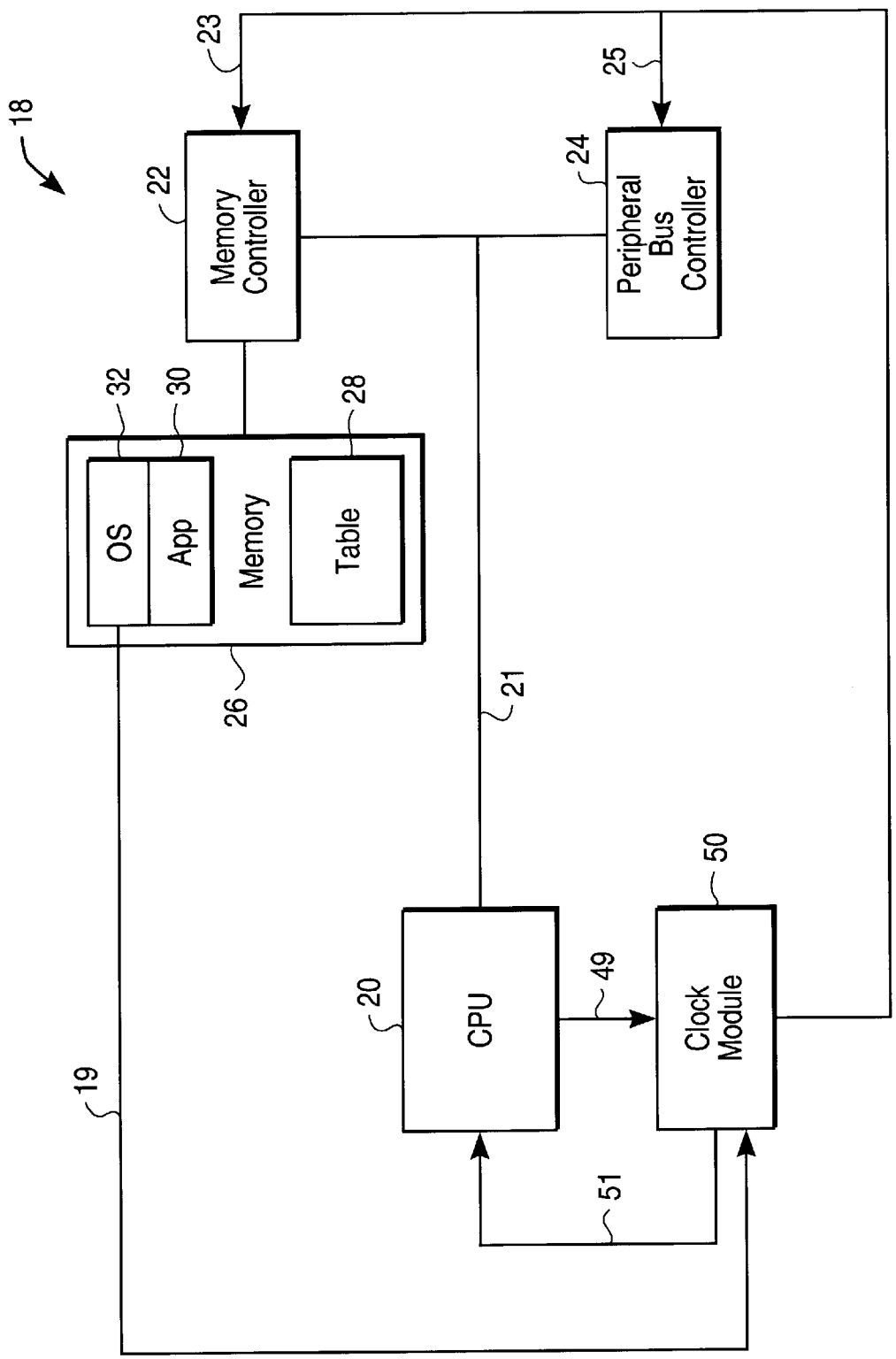
FIG. 1 is a block diagram of a computer system including a CPU speed optimizing system in accordance with a specific embodiment of the present invention.
Figure 2:
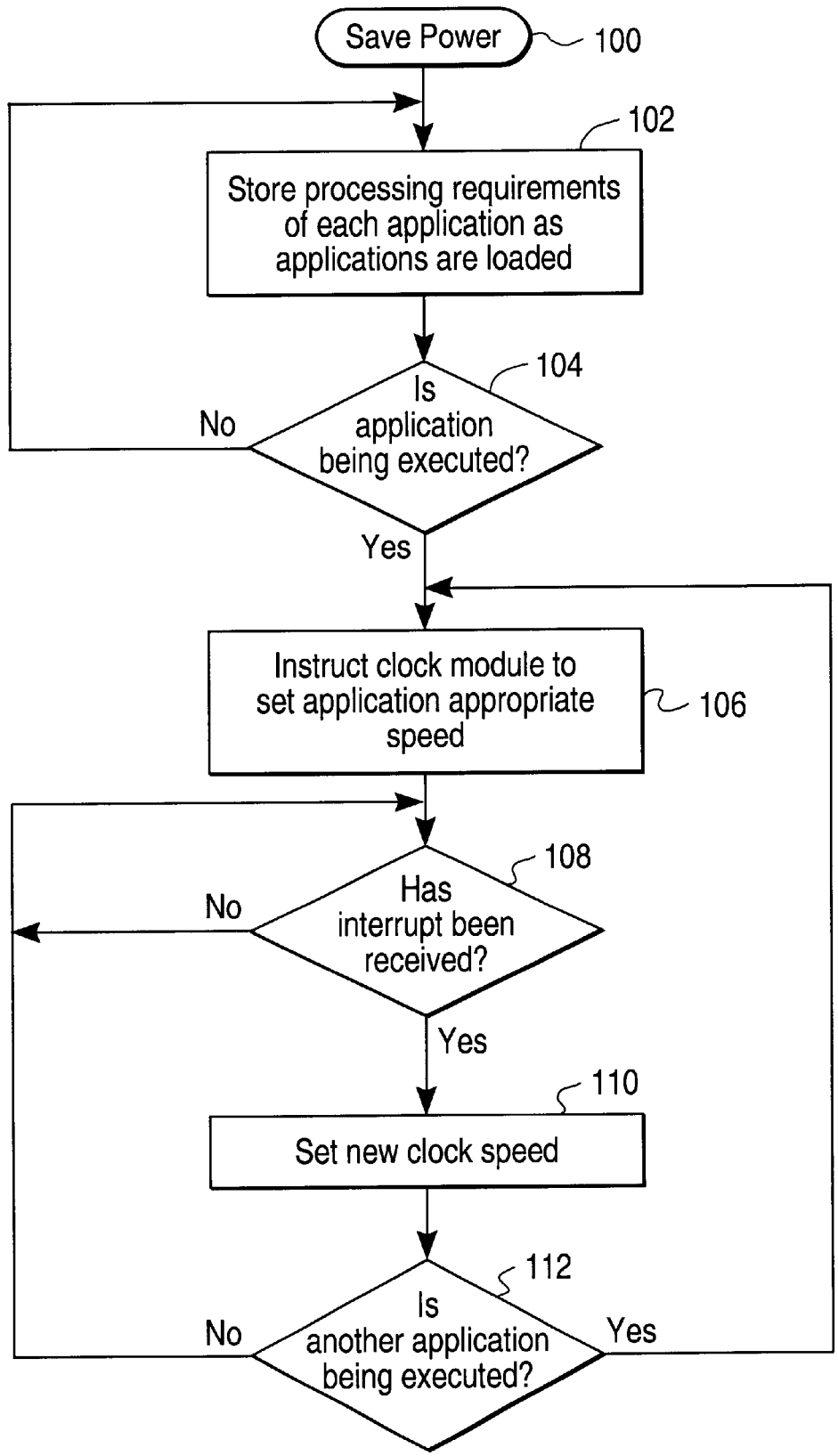
FIG. 2 is a flow diagram showing the CPU speed control system in operation, in accordance with a specific embodiment of the present invention.

Referring to FIG. 1, an exemplary PC embodying the CPU speed control system, generally identified with the reference 18, is described and illustrated. However, the principles of the present invention are clearly applicable to other types of CPU controlled systems, as mentioned above, and are considered to be within the broad scope of the present invention.

The exemplary CPU control system 18 includes a CPU 20 coupled to an intelligent programmable clock module 50 having a frequency synthesizer for providing the CPU 20 with a clocking signal. In accordance with this aspect of the invention, in order to ensure the proper operating frequency of the CPU 20, a feedback circuit is used. In particular, the clock module 50 is able to inform the CPU 20 of its output frequency through line 51, and the CPU 20 in turn can instruct through line 49 the clock module 50 to increase or decrease the output frequency as needed, thereby enabling the CPU 20 to regulate its own operating clock speed. This process repeats in a constant manner via the feedback loop 51 to ensure that the proper operating frequency is maintained by the CPU 20.

The CPU 20 is able to determine the appropriate clocking frequency required for proper operation based on a number of criteria, including whether the CPU 20 is running an idle task. If the CPU 20 is running the idle task, which is typically the case, the system and/or the CPU 20 may be put into the slower mode. Similarly, when the CPU 20 leaves the idle task, the faster mode may be enabled.

In such an embodiment, the clock module 50 is responsive to signals generated by an operating system (OS) 32, stored in a memory 26, such as a random access memory or an electronically programmable memory, such as flash memory. The memory 26 also stores a table 28 which is used for storing standard interrupt handler information, including an interrupt list and addresses for interrupt handlers. In the present embodiment, the table 28 may be used to store information regarding interrupt handlers and their associated CPU operating requirements. In particular, the table 28 may be used to store a predetermined minimum clock processing speed at which the CPU 20 may operate when the OS 32 is in an idle state. Thus, for example, if no tasks are being performed by the CPU 20, the OS 32 may enter an idle state, thereby generating an OS_Idle signal. Note that the idle signal notification methods are known in the art and therefore implementation specifics are not provided herein. Upon determining that the system has entered an idle condition, the OS 32, will access the table 28 and read the CPU speed associated with the OS_Idle state. Accordingly, the OS 32 will send a signal through line 19 to the clock module 50 instructing it to provide the CPU 20 with the clock speed specified in the table 28 associated with an OS_ldle signal. As a result, the clock speed of the CPU 20 will be decreased to the lowest possible speed at which the system will operate properly.

Similarly, the table 28 may be used to store a predetermined value of the CPU 20 clock speed when the OS 32 is no longer in an idle state, such as after receiving a keyboard or a mouse interrupt. Typically, for maximum performance, this entails the CPU 20 operating at its highest rated clock speed. Thus, upon determining that a keyboard or mouse interrupt is received, the OS 32 accesses the table 28 and determines the predetermined CPU operating clock associated with the particular interrupt received. Accordingly, the OS 32 then instructs the clock module 50 to supply the CPU 20 with the predetermined clock frequency.

Therefore, in operation, the system enters a mode wherein the CPU 20 operates at a lower speed when the OS 32 determines that no processing is occurring or has not occurred for a predetermined amount of time. Upon the user entering keystrokes on the keyboard, moving the mouse, or performing some other activity, the OS 32 receives the interrupt, cross references it against the table 28 and instructs the clock module 50 to increase the clock frequency to the CPU 20.

In accordance with another aspect of the invention, the CPU speed control system 18 is adapted to provide a programmably variable clock frequency to the other controllers and buses in the system, such as the memory controller 22 and/or the system or peripheral bus controller 24. In this aspect of the invention, lowering of the clock frequency at which each of the controllers operates further contributes to overall power savings. Accordingly, data and commands will travel through the data/command bus 21 at a proportionally slower speed as well.

In particular, the clock module 50 supplies a clocking signal to the memory controller 22 through a memory clock control line 23 and supplies a clocking signal to the system bus controller 24 through a system bus clock control line 25. It is to be noted that although both the clock control lines are shown as originating from the same clock module 50, the memory clock control line 23 and the system bus clock control line 25 may be spearate lines if using multiple clock modules to supply different speed clocking signals to each controller. The memory controller 22 is also coupled to the memory 26, which in addition to storing the OS 32 also stores loaded applications 30. The system bus controller 24 may be coupled to optional peripheral devices. Thus, as described above, when the OS 32 sends a signal to the clock module 50 instructing it to provide the CPU 20 with the clock speed specified in the table 28 associated with an OS_idle signal, both the memory controller 22 and the system controller 24 operate at the specified lower clock speed. Similarly, once the system leaves the OS_idle state and the clock output of the clock module 50 increases, the memory controller 22 and the controller 24 likewise speed up.

In accordance with another embodiment of the invention, the OS 32 is used to control the frequency of the clock module 50 in response to a CPU utilization application that dynamically monitors the level of CPU usage. Such CPU monitoring programs are widely available and, in many instances, are included with the operating system software. CPU utilization levels vary depending on the particular application and the number of applications being executed at any given time. For example, in a system having a 266 MHz Pentium II processor, an application such as a word processing program may require only 5–10% of the CPU's 20 resources, whereas a graphics rendering program may require upwards of 90%. Other applications, such as a computer aided design (CAD) program may require some amount in-between, such as 35–40%. Thus, the CPU executing the word processing program, instead of operating at full clock speed and utilizing only 10% of the cycles, may be clocked at 33 MHz and use 90% of the CPU cycles. Similarly, the CAD program may require the CPU to operate at 150 MHz to maintain a 90% usage rate.

Depending upon the CPU utilization values provided by the CPU monitor, the OS 32 generates an interrupt to the clock module 50 instructing it to raise or lower the clocking frequency provided to the CPU 20. Optionally, the OS 32 may be programmed such that an interrupt is generated only when a predetermined threshold is exceeded. For example, the CPU 20 may be clocked at 40 MHz for a particular program which requires the CPU 20 to operate at 30 MHz, thus only requiring a 80% usage rate. Once another program is run, CPU utilization may increase to 90%. At that point, to prevent possible computer crashes, the OS 32 generates an interrupt to increase the speed of the CPU 20 to return to an 80% CPU usage rate. Similarly, as CPU utilization decreases, the OS 32 generates interrupts to decrease CPU speed.

In accordance with another embodiment of the invention, the operating system 32 is used to control the frequency of clock module 50 in response to the particular application or task being executed by the system. For example, to operate at full capacity, an application program such as a word processor may require that a 266 MHz Pentium processor operate at only 33 MHz, whereas a processor intensive application such as a voice dictation may require full processing speed.

The memory device 26, as mentioned above, stores the OS 32, the table 28 and applications programs 30. In this particular embodiment, each interrupt handler has a built-in number indicating its performance requirement. When the computer system has been booted, the various processing requirements are loaded into the table 28 by either the OS 32 or the application program 30. In particular, each application program or other task has a particular predetermined optimal operating frequency associated with it. Typically, this assignment may be done in the operating system. It is conceivable, however, that the assignment may be done in applications or other run-time libraries as well. As described earlier, the processing performance requirements may be placed in the same table that lists the interrupts and the addresses of the interrupt handlers (e.g., in table 28).

Processing performance can be calculated in a variety of ways. In particular, the requirement may be a time requirement such as five microseconds, indicating that the task needs service every five microseconds. When the table is loaded, the processor performance is checked, and the clock speed is loaded into the table. For example, a Pentium may need a higher clock speed than a Pentium II to service interrupts every five microseconds. It should be noted that the performance requirement may be based a standard benchmark, e.g. Winstone 10.3, which would then be translated to the clock speed required for the processor when the table is loaded When a particular piece of code or application program is executed, and a particular interrupt is called, the OS 32, before loading the interrupt handler, sends a command to the clock module 50 to output the appropriate clock frequency. Typically, the clock module 50 drives the entire system bus (as mentioned above) and thereby reduces power requirements for the processor, related chipsets, memory, controllers and the like. Similarly, in a multiprocessor system (not shown), a separate clock module 50 may be used for each processor, or a single clock module 50 may drive all the processor clocks. In certain instances, due to particular system board architecture, the CPU and system buses may be clocked using separate clock modules. In such an instance, a separate programmable clock module may be used (not shown) which may be responsive to a second clock value that may be stored in the table 28 as well. However, because power consumption is almost proportional to CPU clock speed, the most cost effective method to reduce power consumption is to vary the CPU 20 clock speed.

As mentioned above, when the OS_ldle signal is active, the lowest power consumption occurs. However, when an interrupt is received by the system, such as through mouse input or keyboard input, the clock speed corresponding to the next task is set. Furthermore, depending on the system type, the system may benefit from switching from the high speed to the low speed and vice-versa, between keystrokes. Generally, since the user is typing only a few characters per second at the fastest, 100's of millions of clock cycles may be saved if such switching is used.

In operation, the system immediately enters a saved power sub-routine in step 100, which may be a function of the boot-up process. In step 102, when the operating system is loaded, or in the case of an application program, in the program where its libraries are loaded, the various processing requirements are placed into the table 28 in memory 26.

In step 104, the system determines whether an application is being executed and if a particular interrupt handler is called. If it is determined in step 104 that an application is being executed, the operating system, before loading the interrupt handler sends a command to the intelligent clock module in step 106 to set the appropriate speed. However, if an application is not being executed, then the system returns to step 102 and loads further applications as required.

In step 108, the system determines whether an interrupt has been received. If so, then in step 110 the system sets the frequency synthesizer to the new clock speed which was preset and stored in the table. If no interrupt was received, then the system returns to step 108 and continues to wait for an interrupt.

Upon setting of the new clock speed in step 110, the system in step 112 determines whether another application is being executed. If no other applications are being executed, then the system returns once again to step 108 to determine whether another interrupt is received. However, if another application is being executed, the system returns to step 106 and instructs the frequency synthesizer to set the appropriate speed that corresponds to the particular application being executed.

What is claimed is:

1. A central processing unit (CPU) speed control system, comprising:
   one or more CPUs;
   a programmable frequency synthesizer adapted to provide said one or more CPUs with a variable clocking frequency;
   a memory device adapted to store one or more application specific CPU performance requirements; and means for enabling said variable clocking frequency to be varied in response to said stored performance requirement;

wherein said memory device includes a table adapted to store one or more interrupt handler routines, said table further adapted to store one or more performance requirements corresponding to each of said one or more interrupt handlers.

2. The system of claim 1, wherein said memory device includes a storage device to store one or more performance requirements corresponding to whether said CPU is in an idle state.

3. A central processing unit (CPU) speed control system, comprising:

one or more CPUs;

a programmable frequency synthesizer adapted to provide said one or more CPUs with a variable clocking frequency;

a memory device adapted to store one or more application specific CPU performance requirements; and means for enabling said variable clocking frequency to be varied in response to said stored performance requirement;

wherein said enabling means includes means for sending a command from an operating system to said frequency synthesizer to enable said frequency synthesizer to alter its frequency.

4. A CPU speed control system, comprising:

one or more CPUs;

a programmable frequency synthesizer adapted to provide said one or more CPUs with a variable clocking frequency;

a memory device to store one or more application specific CPU performance requirements; and means for enabling each of said one or more CPUs to vary its own said clocking frequency responsive to said performance requirements wherein said enabling means includes means for sending a command from an operating system to said frequency synthesizer to enable said frequency synthesizer to alter its frequency.

5. A CPU speed control system, comprising:

one or more CPUs;

a programmable frequency synthesizer to provide said CPUs with a variable clocking frequency;

a memory device to store one or more application specific CPU performance requirements; and means for enabling said one or more CPUs to alter said variable clocking frequency, wherein said enabling means includes means for sending a command from an operating system to said frequency synthesizer to enable said frequency synthesizer to alter its frequency.

6. In a computer system, a system for providing power management features, comprising:

one or more CPUs;

an input/output (I/O) bus;

a memory bus;

a memory device for storing application specific performance criteria associated with specific applications;

one or more intelligent clock modules to provide one or more programmably variable operating frequencies to said one or more CPUs, said I/O bus and said memory bus, said operating frequencies based on said application specific performance criteria, said one or more intelligent clock modules adapted to receive one or more signals from an operating system to enable varying of said operating frequencies.

7. The system of claim 6, wherein said one or more CPUs may alter said operating frequency output by said intelligent clock module to said one or more CPUs to enable each said one or more CPUs to alter its own operating speed.

8. In a computer system, a system for providing power management features, comprising:

one or more CPUs;

a memory device for storing application specific CPU processing requirements defining CPU performance requirements for running one or more applications;

a CPU resource utilization monitor to determine the amount of CPU resources being used by the computer system; and an intelligent clock module to provide a variable operating frequency to said one or more CPUs based on the CPU performance requirements for running one or more applications, said intelligent clock module adapted to receive one or more signals from an operating system to enable varying of said operating frequency.

9. The system of claim 8, further including means for setting a predetermined threshold level at which said CPU operating frequency is automatically varied.

10. A method in a computer system having a CPU, a memory bus and an I/O bus for varying the frequency to said CPU, said memory bus and said I/O bus, the method comprising the steps of:

providing one or more programmable frequency synthesizers to provide one or more variable clocking frequencies; and enabling said one or more clocking frequencies supplied by said one or more programmable frequency synthesizers to be varied based on CPU processing requirements associated with one or more applications programs wherein said enabling comprises sending commands from an operating system to said one or more frequency synthesizers to enable said frequency synthesizers to alter their frequencies.

11. The method of claim 10, further including the step of determining the level of CPU utilization.

12. The method of claim 10, further including the step of varying said clocking frequency to said memory bus.

13. The method of claim 11, further including the step of varying said clocking frequency to said CPU in response to the level of CPU utilization.

14. The method of claim 11, further including the step of varying said clocking frequency to said I/O bus.

15. The method of claim 10, further including the step of varying said clocking frequency to said CPU in response to said processing requirements when said one or more applications is executing.

16. A CPU speed control system, comprising:

one or more CPUs;

a programmable frequency synthesizer adapted to provide said one or more CPUs with a variable clocking frequency;

a memory device to store one or more application specific CPU performance requirements; and means for enabling each of said one or more CPUs to vary its own said clocking frequency, wherein said memory device includes a table adapted to store one or more interrupt handler routines, said table further adapted to store one or more performance requirements corresponding to each of said one or more interrupt handlers.

17. A CPU speed control system, comprising:

one or more CPUs;

a programmable frequency synthesizer to provide said CPUs with a variable clocking frequency;

a memory device to store one or more application specific CPU performance requirements; and means for enabling said one or more CPUs to alter said variable clocking frequency, wherein said memory device includes a table adapted to store one or more interrupt handler routines, said table further adapted to store one or more performance requirements corresponding to each of said one or more interrupt handlers.

18. In a computer system having a memory device for storing application specific CPU processing requirements, a system for providing power management features, comprising:

one or more CPUs;

an input/output (I/O) bus;

a memory bus;

one or more intelligent clock modules to provide one or more programmably variable operating frequencies to said one or more CPUs, said I/O bus and said memory bus, said operating frequencies based on said application specific performance criteria, said performance criteria including one or more performance requirements corresponding to one or more interrupt handlers.

19. A central processing unit (CPU) speed control system, comprising:

one or more CPUs;

a programmable frequency synthesizer adapted to provide said one or more CPUs with a variable clocking frequency;

a memory device adapted to store one or more interrupt handler routines, said table further adapted to store one or more performance requirements corresponding to each of said one or more interrupt handlers;

said programmable frequency synthesizer adapted to vary said variable clocking frequency in response to said one or more stored performance requirements.

* * * * *